(12) United States Patent
Hunter et al.

(10) Patent No.: US 8,610,396 B2
(45) Date of Patent: Dec. 17, 2013

(54) BATTERY BOOST APPARATUS

(76) Inventors: Murray D. Hunter, Mallorytown (CA); David M. Shaver, Brockville (CA)

( * ) Notice: Subject to any disclaimer, the term of this patent is extended or adjusted under 35 U.S.C. 154(b) by 500 days.

(21) Appl. No.: 12/941,470

(22) Filed: Nov. 8, 2010

(65) Prior Publication Data
US 2011/0127947 A1    Jun. 2, 2011

Related U.S. Application Data

(60) Provisional application No. 61/265,516, filed on Dec. 1, 2009.

(51) Int. Cl.
*H02J 7/00* (2006.01)
*H02J 7/02* (2006.01)

(52) U.S. Cl.
USPC .......... 320/105; 320/104; 320/107; 320/109; 320/111; 320/112

(58) Field of Classification Search
CPC .................................... H02J 7/0034
USPC ........................................................ 320/105
See application file for complete search history.

(56) References Cited

U.S. PATENT DOCUMENTS

| | | | |
|---|---|---|---|
| 4,943,777 A | 7/1990 | Nakamura et al. | |
| 6,249,124 B1 | 6/2001 | Bertness | |
| 6,380,712 B2 | 4/2002 | Murphy et al. | |
| 2007/0210801 A1 | 9/2007 | Krampitz et al. | |
| 2007/0278990 A1 | 12/2007 | Raichle et al. | |
| 2008/0238360 A1* | 10/2008 | Stone et al. | 320/107 |
| 2009/0174362 A1* | 7/2009 | Richardson et al. | 320/105 |

* cited by examiner

*Primary Examiner* — Edward Tso
*Assistant Examiner* — Ahmed Omar

(57) ABSTRACT

A battery boost apparatus is described. The battery boost apparatus monitors that amount of voltage in the vehicle battery and the current flowing to the vehicle battery to determine an existence of a fault condition. If a fault condition exists, a vehicle battery is cutoff from the boost battery and the charge of the boost battery is maintained until the fault condition is remedied.

23 Claims, 12 Drawing Sheets

BATTERY BOOST APPARATUS

CROSS-REFERENCE TO RELATED APPLICATIONS

This application claims the benefit and priority of U.S. Ser. No. 61/265,516 filed Dec. 1, 2009. The entire disclosure of the above application is incorporated herein by reference.

FIELD

The present disclosure relates to a battery boost apparatus that detects the existence of a fault condition relating to the charging of the vehicle battery.

BACKGROUND

Almost every vehicle owner at some point or another has returned to his or her vehicle only to find that the battery is "dead." Car batteries are typically drained when the lights are left on or some other load is left to draw power from the battery without the motor turning the alternator. Typically, the vehicle owner will try to find a good Samaritan to provide a jump, i.e. connecting the depleted battery to the good Samaritan's battery to start the motor, which turns the alternator, which recharged the depleted battery. Too often, however, the good Samaritan is not to be found. Thus, manufacturers have started to market battery boost devices which are portable rechargeable batteries that the user can connect to the vehicle battery to jump start the motor. These boost devices are charged by at an AC power outlet and then may be stored in the car.

A typical battery boost will have an 18V DC sealed lead acid battery pack (an "SLA battery") that may be comprised of three 6V SLA batteries or a 12V SLA battery and a 6V SLA battery. When used, the user may plug a DC adaptor into the cigarette lighter of the car and can charge the battery over a period of 20 minutes. If the battery is in deep discharge, or a load continues to draw power from the battery, the battery boost may become depleted without providing enough power to the vehicle battery to start the motor. As the existence of the battery boost drain may be unknown to the user, a need exists for a mechanism to alert the user that a load is continuing to draw power or to cut off the power provided to the vehicle battery until the load is turned off.

Further, the SLA battery can hold a charge capable of starting the car for up to six months. As the battery boost is charged, placed in the trunk, and forgotten by the vehicle owner, the owner may not be aware of the amount of charge remaining in the battery. Thus, there also exists a need for a mechanism that reminds a user when the battery boost needs to be recharged.

This section provides background information related to the present disclosure which is not necessarily prior art.

SUMMARY

A portable battery boost apparatus for charging a vehicle battery is described. The boost apparatus comprises a boost battery that couples to the vehicle battery, a voltage monitoring module that monitors an amount of voltage in the vehicle battery and outputs a voltage reading indicative of an amount of voltage in the vehicle battery, a fault monitoring module that determines an existence of a fault condition based on at least one of the voltage reading and a current reading indicating an amount of current flowing from the boost battery to the vehicle battery, and a boost battery cutoff module that decouples the boost battery from the vehicle battery upon determining the existence of the fault condition.

Further areas of applicability will become apparent from the description provided herein. The description and specific examples in this summary are intended for purposes of illustration only and are not intended to limit the scope of the present disclosure.

DRAWINGS

Figure 11:
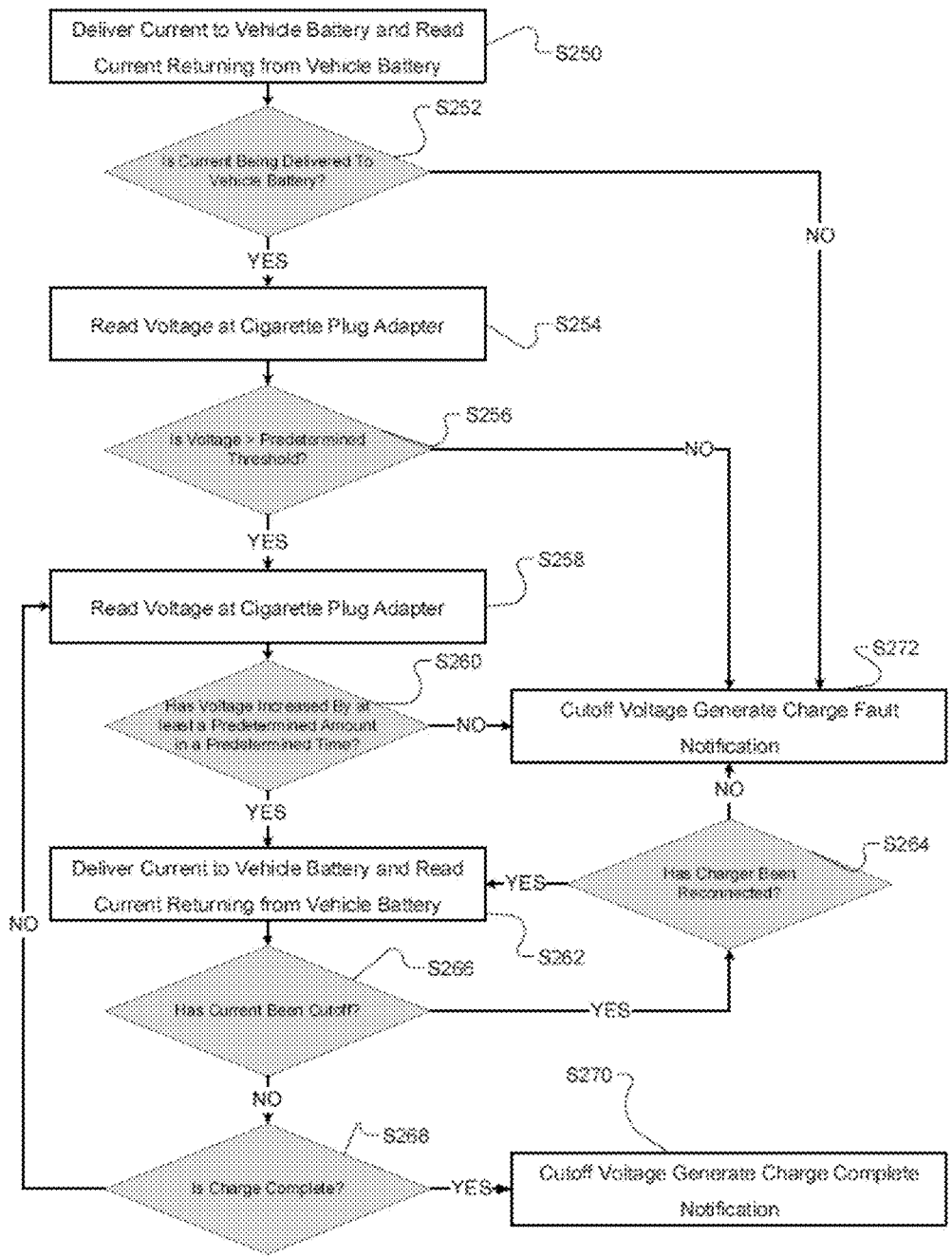
Figure 12:
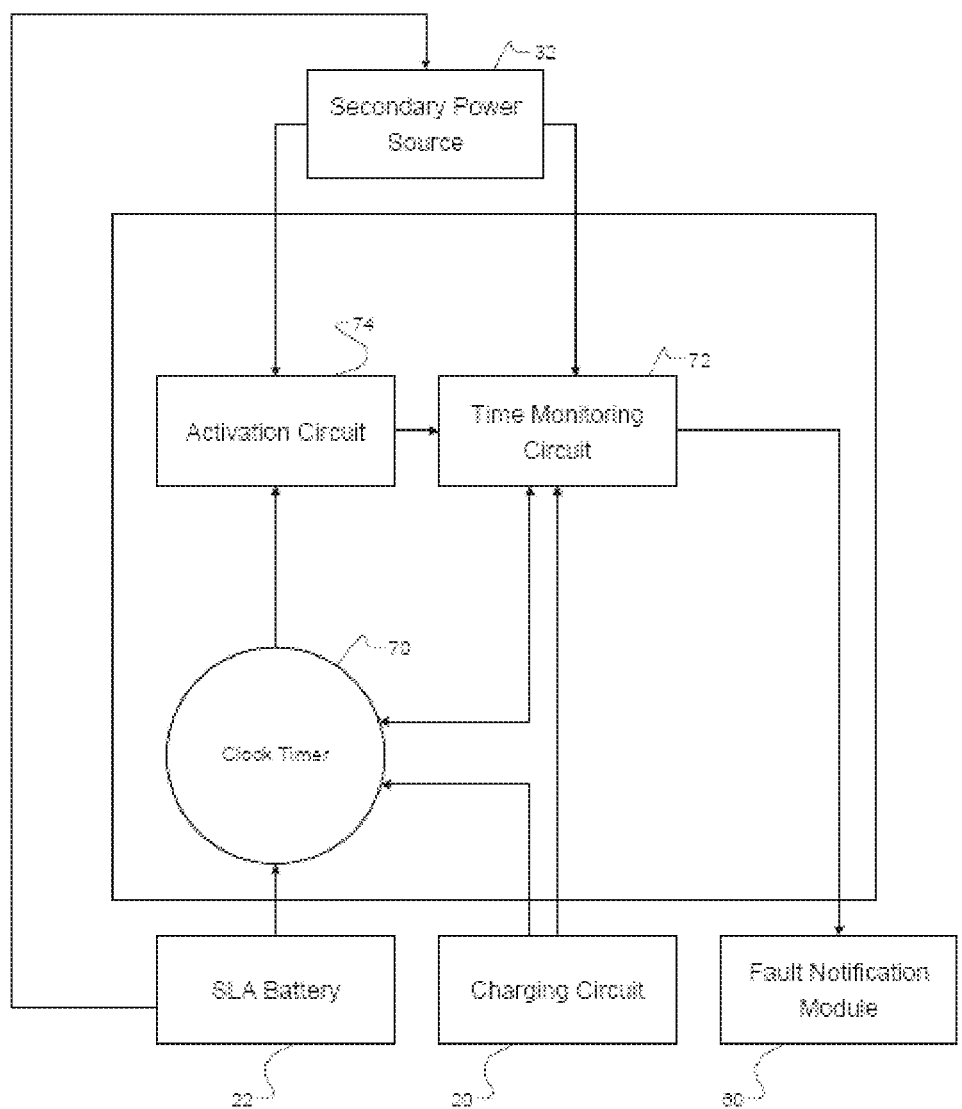

FIG. 11 is a flow chart illustrating an exemplary method that is executed by the fault detection module; and FIG. 12 is a block diagram illustrating an exemplary maintenance reminder circuit The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Example embodiments will now be described more fully with reference to the accompanying drawings.

Figure 1:
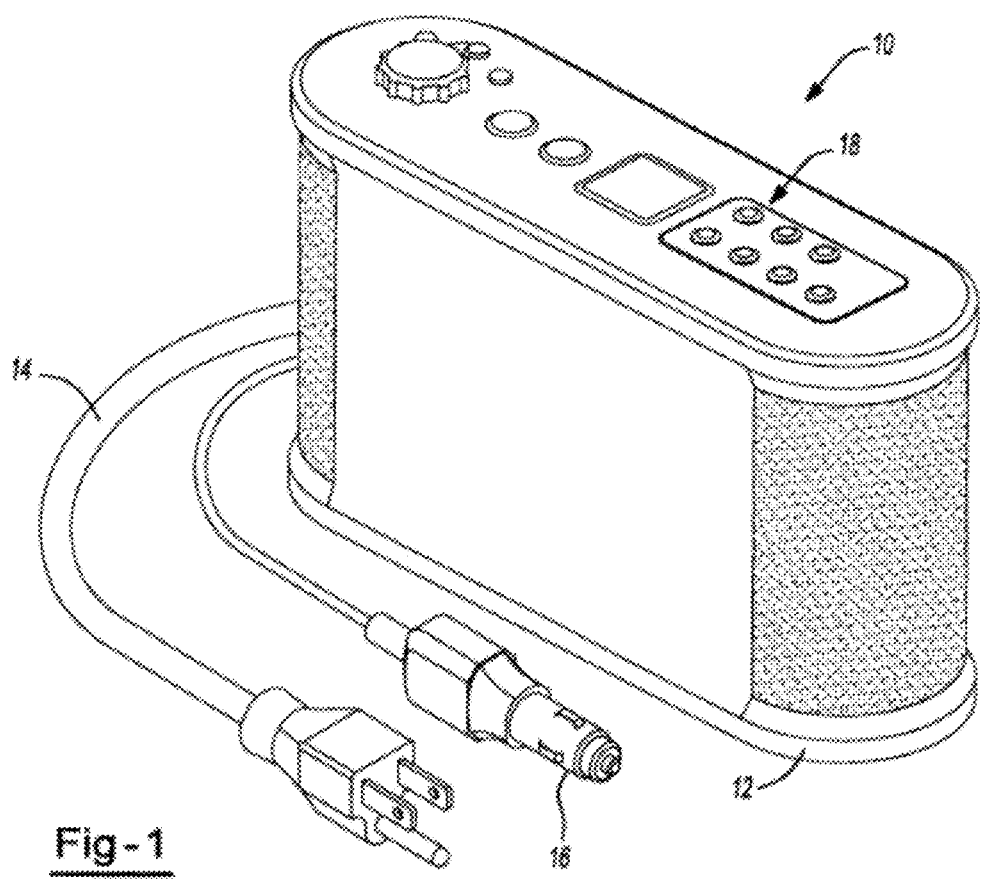
FIG. 1 illustrates an exemplary embodiment of a battery boost device.

FIG. 1 illustrates an exemplary embodiment of a battery boost device 10. The battery boost device 10 may be comprised of a housing 12 that contains the SLA battery (not shown) and the internal circuitry (not shown) of the device 10. The battery boost device 10 includes a power cord 14 that may connect to an AC power source and a plug 16 for providing power to the vehicle battery via the cigarette lighter receptacle. It is envisioned, however, that the plug 16 may be replaced with a pair of insulated wires having alligator clips at the distal end of the wires, which may be connected directly to the terminals of the vehicle battery.

An exemplary SLA battery may be an 18V battery pack comprised of three 6V batteries or a 12V battery and a 6V battery. It is appreciated that alternative battery pack configurations may be used. An exemplary SLA battery may preferably have a 3.2 Ahr nominal capacity and should be capable of delivering a minimum of 30 W-hrs of energy to the vehicle through the cigarette lighter receptacle in about 20 minutes following full charge at a peak starting current of 6.5 A. After 6 months, the SLA battery may preferably be able to deliver 24 W-hrs through the cigarette lighter receptacle in about 20 minutes. Further, in some embodiments, the battery pack is capable of delivering DC output to a vehicle while the battery pack is charging. The SLA battery may also include a back feed protection diode.

To charge the battery boost device 10, a user will plug the power cord 14 into a AC outlet for an extended period of time to charge the SLA battery of the battery boost device 10. Once charged, the user may store the battery boost device 10 without a recharge for up a predefined time period, e.g. six months. The user may be reminded to recharge the battery by an LED maintenance indicator in a LED 18 panel located on the exterior of the battery housing 12. Alternatively, a cheap LCD screen may be used to show the user how much time has elapsed since the last charge and/or how much time until another charge is required. It is envisioned that alternative means of notifying a user of battery maintenance may used, such as a audio indicator used in place of or in combination with a visual indicator.

LED panel may also include LED fault indicators that alert the user of the existence of a fault condition. A fault condition may be a condition that exists either in the vehicle or the boost device 10 itself. Examples of fault conditions may include, but are not limited to: the boost current is flowing but the adapter plug voltage is too low; no current is detected flowing into the vehicle through the cigarette lighter receptacle; or the plug is removed mid charge and vehicle boosting is interrupted.

To charge the vehicle battery, the user may insert the plug 16 into the cigarette lighter receptacle of the car. The current delivered via the plug 16 may be limited to 8 A, as the cigarette lighter receptacle may not be able to handle a greater current. Further, the voltage delivered from the 18V battery of the boost device 10 may be limited to 12V, so as not to damage the vehicle battery. As will be described, the boost device monitors the amount of voltage in the vehicle battery and may cutoff the vehicle battery if a fault condition is detected. This cutoff mechanism saves the battery of the battery boost device 10 from being depleted without charging the vehicle battery. In some embodiments, the LED panel 18 of the boost device 10 may indicate the type of fault condition to the user, so that the user may correct the problem and resume boosting the vehicle battery.

Figure 2:
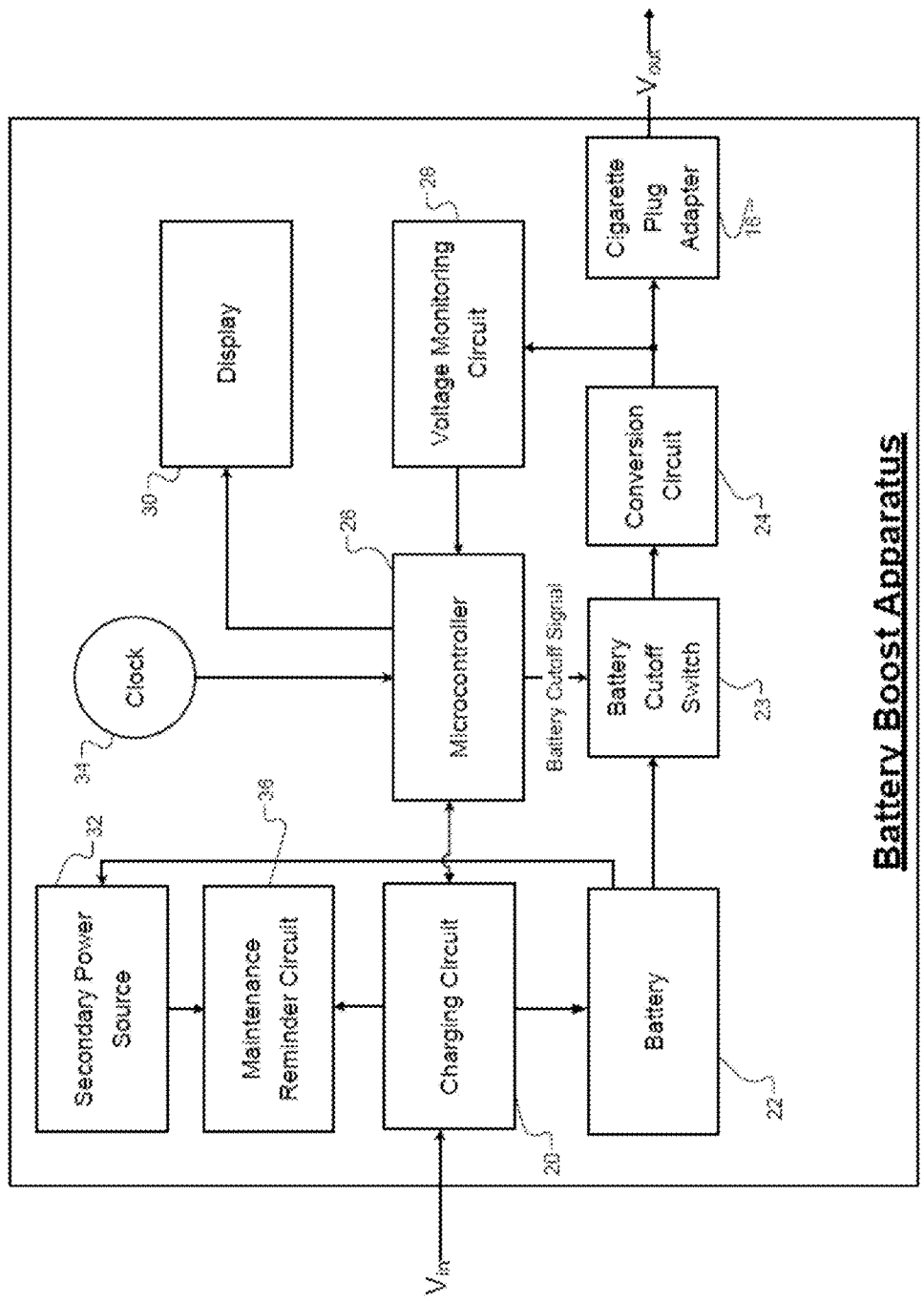
FIG. 2 is a block diagram illustrating exemplary circuit components of the battery boost device.

FIG. 2 illustrates exemplary circuit components of the battery boost device 10. The components may include but are not limited to a charging circuit 20 that receives an AC current from a power supply, an SLA battery 22, a conversion circuit 24 that converts the 18V DC to a voltage suitable for the vehicle battery, a microcontroller 26 that controls the various components; a voltage monitoring circuit that monitors the voltage at the connection between the vehicle and the boost device 10. It is appreciated that in some embodiments, the boost device may include a display circuit 30 which may include the LED panel. Also, a secondary power source such as a coin battery may also power certain components of the boost device 10. A clock 34 may be coupled to the microcontroller 26. The clock 34 may be used to determine if a fault condition triggering event exceeds a predetermined amount of time.

To charge the battery 22 of the battery boost device 10, a charging circuit receives the AC from the power cord 14 (FIG. 1). The charging circuit may receive 120V AC or 220V AC and convert it to a DC and deliver the DC to the SLA battery. In other embodiments, the charging circuit may receive a 12V DC input from the vehicle. The charging circuit 20 may be any type of charging circuit known in the art.

Voltage monitoring circuit 28 reads the amount of current being delivered to cigarette plug adaptor 16. The boost is designed to pass constant current through the cigarette plug adaptor 16. Thus, the voltage, V', of the vehicle battery is indicative of the amount of current, $I_{OB}$, that has been delivered during the boost period. The voltage reading V' is communicated to the microcontroller 26.

Figure 3:
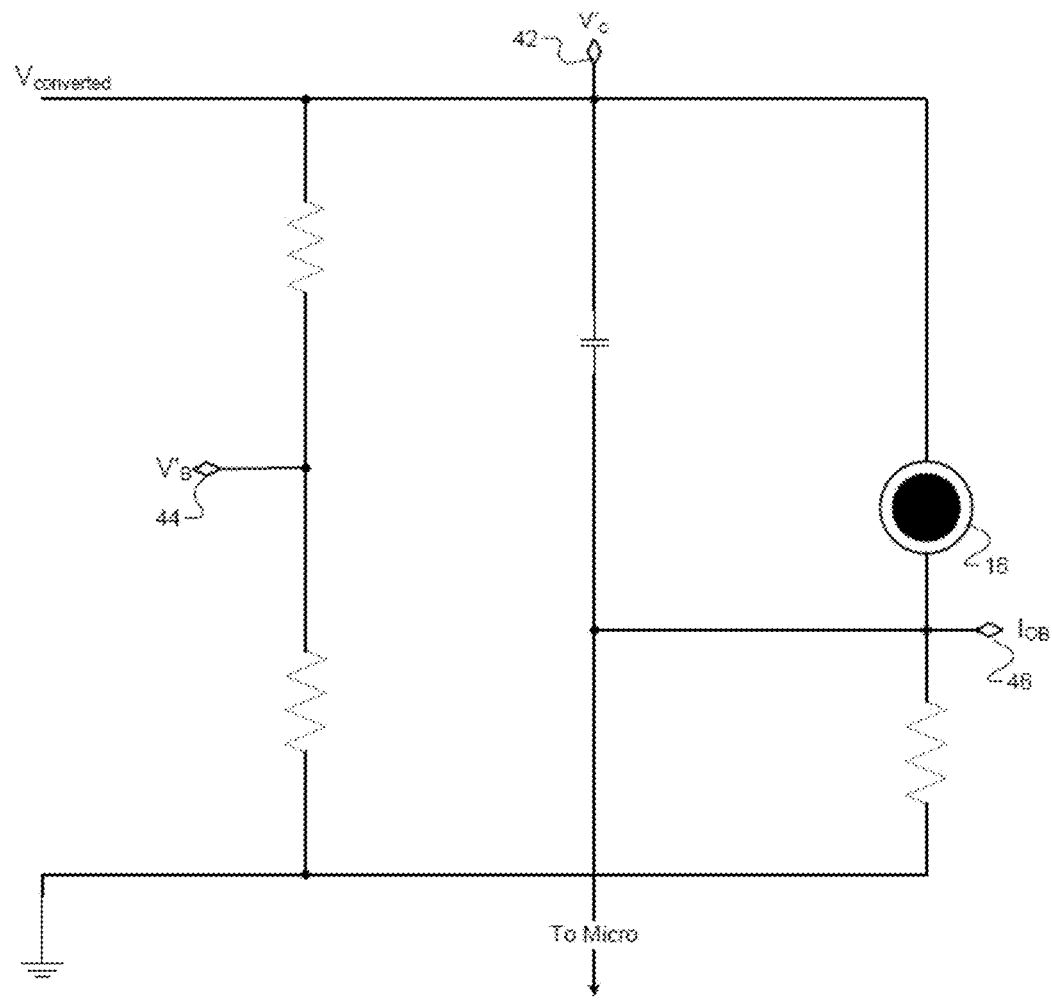
FIG. 3 is a schematic illustrating an exemplary voltage monitoring circuit.

FIG. 3 is a schematic of the voltage monitoring circuit 28. As previously mentioned, the voltage monitoring circuit 28 provides a voltage reading that is indicative of the amount of voltage in the vehicle battery. The voltage monitoring circuit 28 provides voltage readouts $V_C'$ and $V_B'$ at pins 42 and 44, respectively. Furthermore, a current readings at pin 46 indicates the amount of current flowing through cigarette plug adapter 16. If a bad connection exists, such as the ash from actual cigarettes prevents a connection, the reading at pin 46 will be zero. Pins 42, 44 and 46 connect to microcontroller 26 (FIG. 2).

Referring now back to FIG. 2, microcontroller 26 receives the voltage reading V' from the voltage monitoring circuit 28. It should be understood that microcontroller 26 may receive two voltage readings $V_C'$ and $V_B'$, and a current reading $I_{OB}$ from voltage monitoring circuit. Microcontroller 28 may also receive voltage readings $V_{DC\_INA}$ and $V_{DC\_INB}$, indicating the voltage being delivered to the battery. These readings may be used for determining when the SLA battery has been charged. Microcontroller 28 may have a programmable memory storing machine executable instructions for determining the existence of a fault condition. Alternatively, the determination may be performed by hardware. When a fault condition is detected by microcontroller 26, the current flowing to the vehicle battery via the cigarette plug adapter 16 may be cutoff.

Further, microcontroller 26 may communicate with the display 30 to visually indicate to a user that a fault condition exists. Additionally, display 30 may indicate to the user that the battery boost is underway or complete. For example, if no fault conditions exist, a green light on the LED panel of the display 30 may be turned on. Once the boost has completed, e.g. after a predetermined amount of time has been exceeded, a light indicating a successful charge may be turned on.

Figure 4:
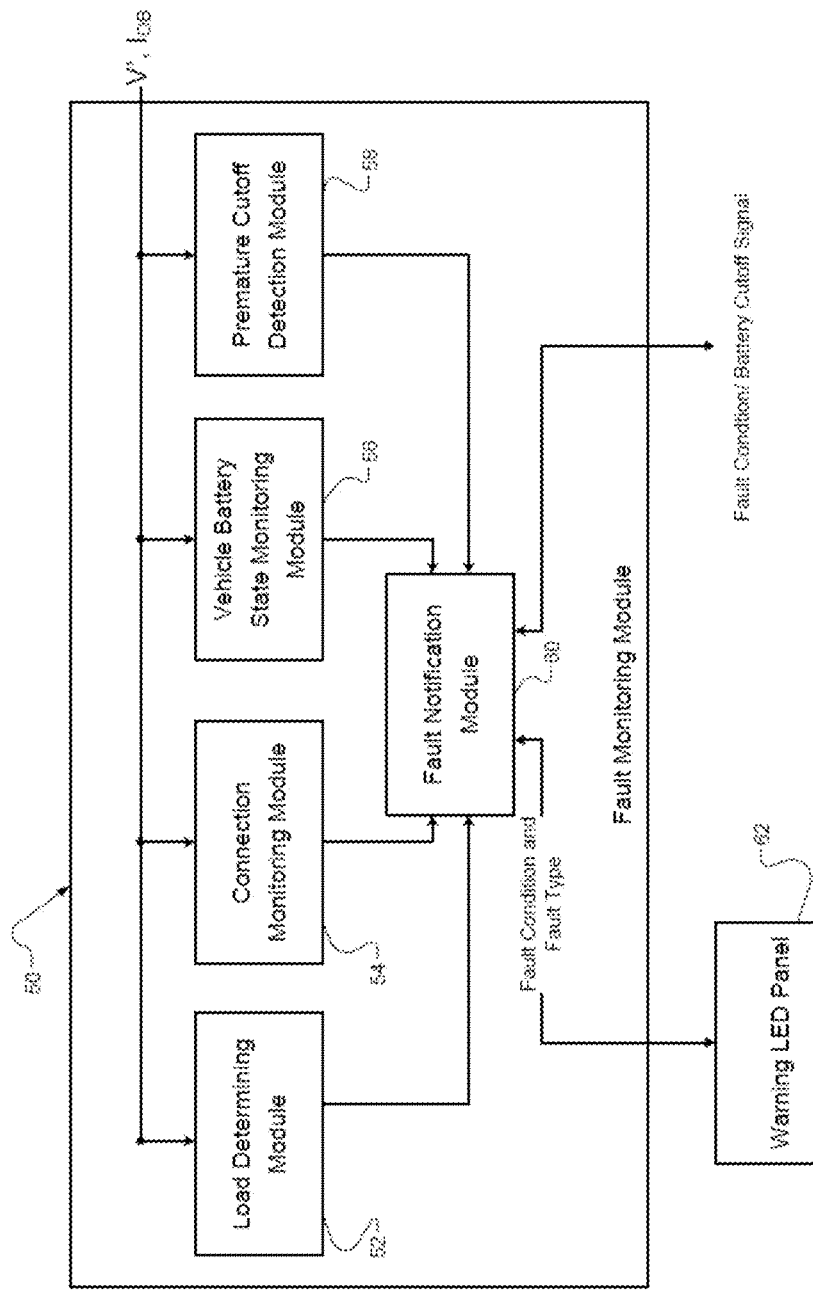
FIG. 4 is a block diagram illustrating an exemplary fault monitoring module.

FIG. 4 illustrates components of a fault detection module 50. Fault detection module 50 includes various modules for determining the existence of a fault condition. Fault conditions may include, but are not limited to, a load in the vehicle drawing power from the vehicle battery, a bad connection between the boost device 10 and the vehicle battery, the vehicle battery being in a deep discharge state, and a blown fuse in either the adapter plug or in the vehicle. Thus, fault detection module 50 may include various modules for monitoring for fault conditions. These modules may include, but are not limited to a load determining module 52, a connection monitoring module 54, a vehicle battery state monitoring module 56, and a premature cutoff detection module 58. The modules may receive voltage readings, V', and/or current readings, I, indicating a voltage in the vehicle battery and the current being delivered to the vehicle battery respectively. If one of the modules 52-58 detect a fault, it will send a signal or notification to the fault notification module 60. Fault notification module 60 receives the fault condition from the notifying module and will send a battery cutoff signal to a switch 23, which will cut power from the boost device 10 to the vehicle battery. Fault notification module 60 may also send a signal indicating a fault and fault type to the LED panel, which in turn may notify the user of the type of fault condition via lighting a corresponding LED. Fault detection module 50 and the various modules 52-60 may be embodied as computer readable instructions stored on a memory associated with the microcontroller 26, or may be implemented in hardware.

Although not required, it is envisioned that some of the modules of the fault detection module 50 may execute prior to the other modules. For example, the connection monitoring module 54 detects if a faulty connection exists between the cigarette plug adapter and the cigarette plug receptacle. If so, the boost apparatus may be precluded from delivering power to the vehicle battery until the connection is fixed. Similarly, the vehicle battery state monitoring module 56 may determine if the vehicle battery is in a deep discharge state. If the battery is in deep discharge, then the boost apparatus may be precluded from delivering power to the vehicle battery. Accordingly, the other modules of the fault detection module 50 need not run because the battery may not be able to be brought out of the deep discharge state. Once the fault detection module 50 has determined that a connection exists and that the vehicle battery is not in a deep discharge state, then the charging may commence. Once, commenced the remaining modules, which actively monitor the voltage and current throughout the charge may be executed.

FIG. 11 depicts an exemplary method that can be executed by the fault detection module 50. At step S250, a current may be delivered via the cigarette plug adapter to the vehicle battery and the current returning from the vehicle battery may be read. At step S252, the read current is analyzed. If the current is 0, i.e. no current is being delivered then a bad connection may exist between the boost device and the vehicle battery and a fault notification may be generated at step S272.

At step S254 the voltage is read at the cigarette plug adapter and at step S256 the read voltage is analyzed. If the voltage is below a predetermined threshold, e.g. 5V, the vehicle battery is determined to be in a deep discharge state and a fault notification is generated at step S272. If not, the method steps to step S258.

At steps S258-S260 the voltage is monitored to determine if there is a load in the vehicle drawing power from the battery. At step S258 the voltage is read at the cigarette plug adapter and at step S260 the read voltage is analyzed. It is appreciated that the microcontroller 26 may have a memory associated therewith. Thus, a value of a previous reading may be stored in the memory. The previous reading is retrieved and compared to the current reading. If the difference between the two readings does not exceed a predetermined threshold, then a fault notification may be generated at S272. If the difference does exceed the predetermined threshold, then the method may step to S262.

At steps S262-S266, the current is monitored to ensure that the connection between the boost device 10 and the vehicle battery has not been interrupted. At step S262, the current is read as it returns from the vehicle battery. If, at step S264, the current reading is 0, i.e. the current has been cutoff, then the method steps to step S266. At step S266, the method waits for a predetermined amount of time, e.g. 2-3 minutes, to check if the charger has been reconnected. If the charger is not reconnected in the predetermined amount of time, the method steps to step S272. If the charger is reconnected the method steps back to step S262. If at step S264, the current has not been cutoff, then the method steps to step S268. At step S268 the method checks if the charge is complete, i.e. has the charge went on for a predetermined amount of time, e.g. 20 minutes. If so, the method steps to step S270 and the charge is completed. If the charge is not complete, the method steps to step S258. It is appreciated that the method executes until the charge is complete, or a fault condition occurs.

The foregoing method is one example of the steps that may be performed to determine if a battery charging has been completed successfully. As previously mentioned, various modules may be used to determine the existence of specific fault conditions. FIGS. 5-8 depict exemplary methods that may be performed by the modules to determine the existence of a fault condition.

Figure 5:
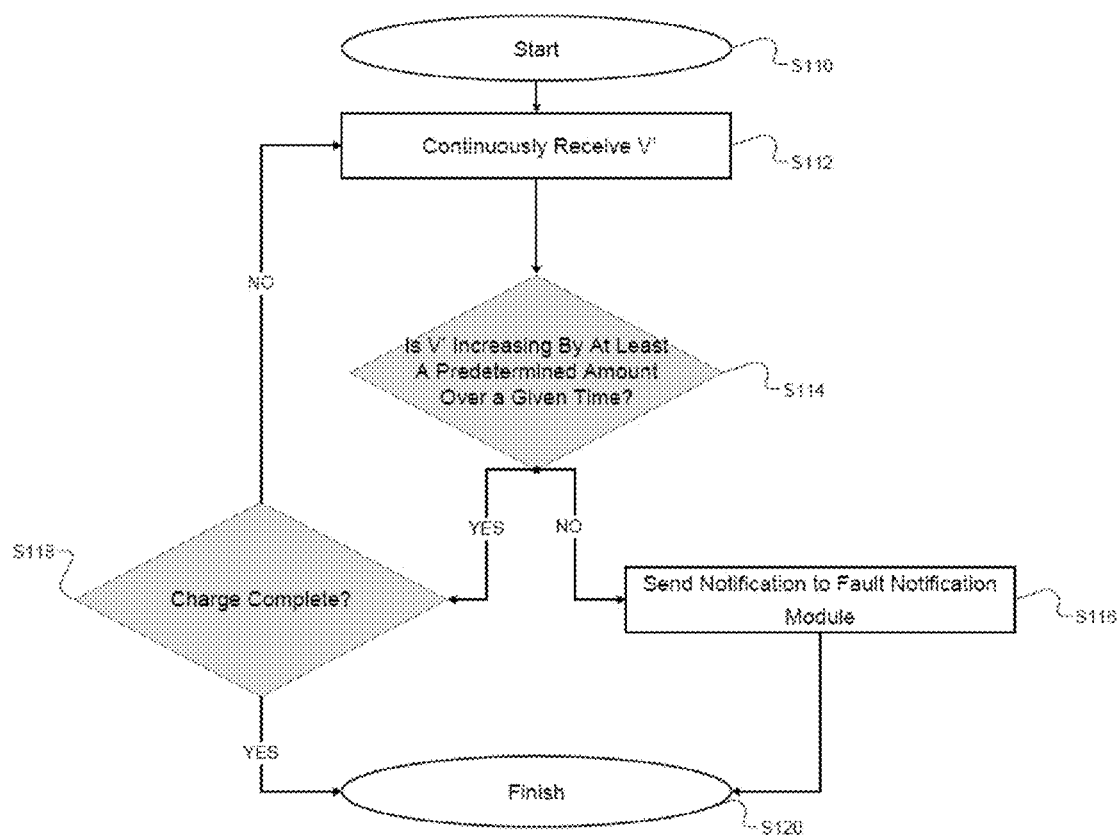
FIG. 5 is a block diagram illustrating an exemplary method for determining the existence of a load drawing power from a vehicle battery.

FIG. 5 depicts an exemplary method for detecting if a load is still drawing power from the vehicle battery. This method may be executed by load determining module 52. The method starts at step S110. At step S112, load determining module 52 may continuously receive readings of V' from the fault monitoring circuit 28. At step S114, the current voltage readings are compared with recent voltage readings to determine whether the voltage in the vehicle battery is increasing. For example, the difference between $V'_{current}$ and $V'_{previous}$ may be calculated. The difference may then be compared to a predetermined threshold. It is appreciated that the measurement for $V'_{previous}$ may correspond to a measurement taken at a predetermined amount of time prior to the current voltage reading, e.g. two minutes before. As previously mentioned, the readings of V' are indicative of the charge of the vehicle battery. Thus, if after the first two minutes V' has not increased or has only increased slightly, then it can be inferred that a fault condition exists. It is further appreciated that the predetermined threshold may be selected so that a balance is struck between false positives (predetermined threshold too low) and false negatives (predetermined threshold too high). A false positive is when the system improperly determines that the voltage is properly increasing, while a false negative is when a load condition exists but is not recognized by the fault detection module 50. A tolerant predetermined threshold may be 2 volts, such that if the voltage has not increased 2 volts in the first 2 minutes, then a fault notification is generated.

If the answer at step S114 is NO, a notification of a fault condition is sent to fault notification module 60 at step S116. As will be described later, the fault notification may cause the power to be cut from the vehicle battery and an LED corresponding to the type of fault condition may be illuminated, to indicate the existence of a particular type of fault condition to a user.

If the answer is YES at S114, then the method determines whether the charge is complete. A charge timer may be implemented such that once the battery boost device 10 begins charging the vehicle battery, the timer starts. Once the timer reaches a predetermined charge threshold, e.g. 20 minutes, without encountering a fault condition, the charge is complete. Thus, at step S118, a determination is made as to whether the charge is complete, if the charge is complete then the method ends at step S120. If the charge is not complete, the method steps back to S112, and the voltage will continue to be read.

Figure 6:
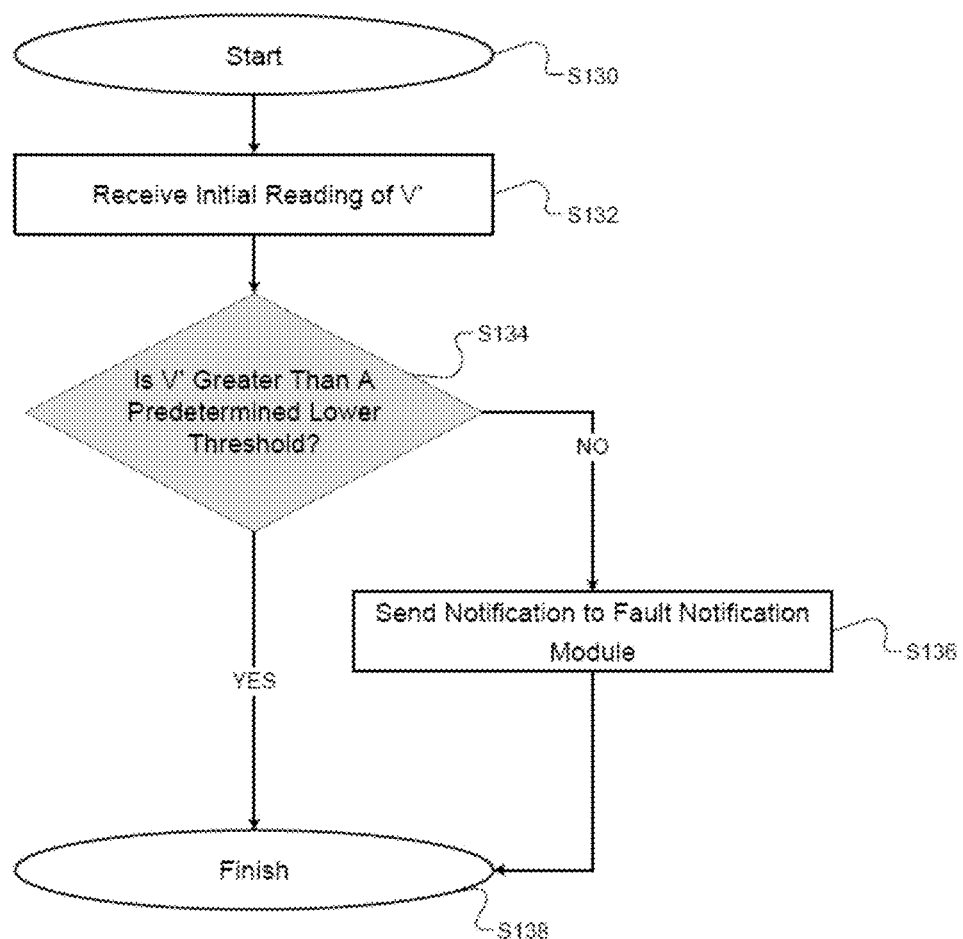
FIG. 6 is a block diagram illustrating an exemplary method for determining if a vehicle is in a deep discharge condition.

FIG. 6 illustrates an exemplary method for determining whether the battery is in a deep discharge state. The method may be executed by vehicle battery state monitoring module 56. The method begins at step S130. At step S132, an initial reading of V' is read from the voltage monitoring circuit 28. At step S134, the initial voltage is compared to a predetermined lower threshold. If the voltage readings remains at a state below the lower threshold after a few readings, then it can be assumed that the vehicle battery is in deep discharge. The method then sends a fault notification to fault notification module 60 at step S136 and ends at step S138. If the read voltage is greater than the threshold, then the method steps directly to step S138.

Figure 7:
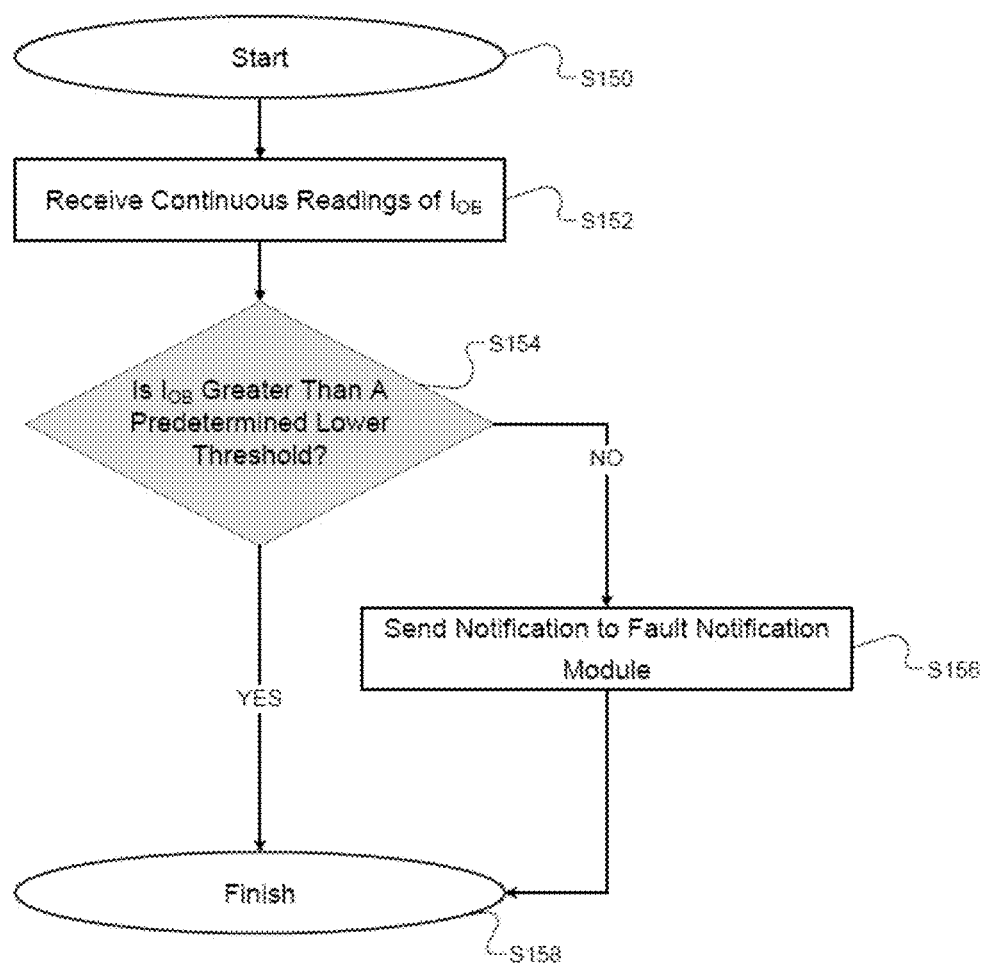
FIG. 7 is a block diagram illustrating an exemplary method for determining if a faulty condition exists.

FIG. 7 illustrates an exemplary method for determining the existence of a faulty connection. The method may be executed by connection monitoring module 54. The method commences at step S150. At step S152, the current flowing to the vehicle, $I_{OB}$, is read from voltage monitoring circuit 28. At step S154, the read current is compared to a predetermined threshold, which may be 0 or a very low current reading. If the current is not greater than the predetermined threshold, then it can be assumed that the connection between the boost device 10 and the vehicle battery is faulty. At step S156, a fault notification is sent to the fault notification module 60. If the connection is not faulty, the method steps directly to S158 and ends.

Figure 8:
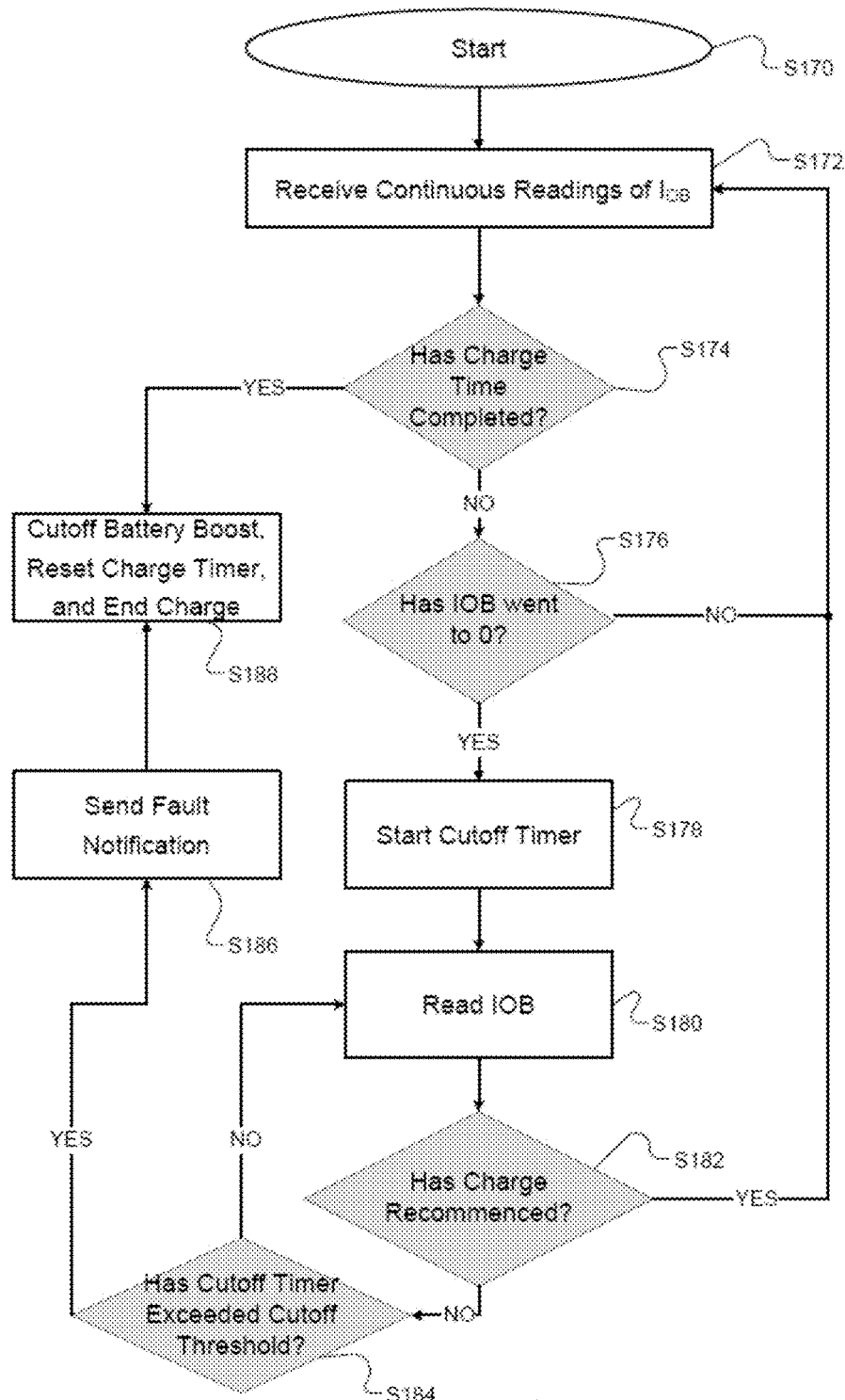
FIG. 8 is a block diagram illustrating an exemplary method for determining if a charge has been interrupted.

FIG. 8 illustrates an exemplary method for determining if a battery charge has been interrupted. If a charge has been interrupted for less than two or three minutes, the boost device 10 may be reconnected without significantly impacting the charging of the vehicle battery. The method may be executed by the premature cutoff detection module 58. The method begins at step S170. At step S172 the current $I_{OB}$ is continuously read from the voltage monitoring circuit. As previously mentioned, a timer indicates the amount of time the battery boost device 10 has been charging the vehicle battery. If the charge time exceeds a threshold such as 20 minutes the charge may be completed. If so, the method jumps from step S174 to S188 and ends. If the charge has not completed, the method steps to step S176. At step S176, the method checks to see if $I_{OB}$ has went to 0. If so, this means that the connection between the battery and the boost device 10 has been interrupted. If at step 176, the current is detected at 0, a cutoff timer is started. The cutoff timer measures the amount of time the charge has been interrupted. Next, at step S180, the current is read again to determine if the boost device 10 has been reconnected. At step S182, if the current is greater than a predetermined threshold, e.g. 0, then the charge is determined to be recommenced. The method can step back to S172 if the charge has recommenced. If the charging has not recommenced, the method steps to step S184. At step S184, the cutoff timer is compared to a predetermined threshold, e.g. 2 or 3 minutes. If the charge has not recommenced after the passing of 2 or 3 minutes, then the method determines that the charge needs to be started from the beginning. Thus, at step S186, the method will send a fault notification to fault notification module 60, reset both the cutoff timer and the charge timer to zero, and step to step S188. By resetting the charge timer, the boost device will have to start the charge from beginning to complete the charge. At step S188, the switch of the boost device connecting the boost device to the vehicle battery is switched OFF, the charge time is reset to 0, and the method ends.

The descriptions of the modules of the fault detection module 50 are exemplary in nature. It is envisioned that subsets of the modules or all of the modules may be combined to monitor the load and current. Further, it is envisioned that using the principles described above, the modules of the fault detection module 50 may also detect, for example, if a fuse is blown in the cigarette plug adapter or if the vehicle battery is fully charged.

Figure 9:
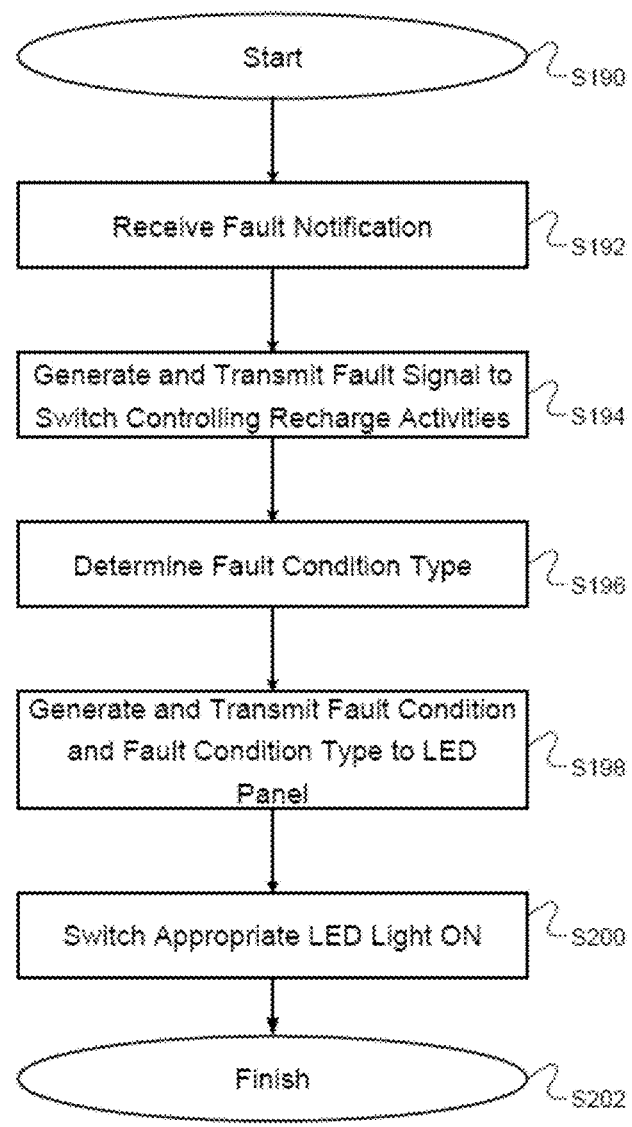
FIG. 9 is a block diagram illustrating an exemplary method for notifying a user of a fault condition.

FIG. 9 illustrates an exemplary method that may be run by fault notification module 60. The method begins at step S190. At step S192 a fault condition notification is received. Upon receiving a fault condition notification at step S194, the switch connecting the SLA battery of the battery boost device 10 to the vehicle battery may be biased to switch the connection between the boost device and the vehicle battery OFF. At step S196, the type of fault condition is determined. It is envisioned that the various fault detecting modules 52-58 may have unique signals to indicate an occurrence of a particular fault condition. Thus, by determining which module sent the fault notification, or by examining the signal itself, the type of fault condition may be determined. Once a fault condition type is determined at S196, a fault notification indicating a fault condition type may be generated and transmitted to the LED panel at step S198. The LED panel may receive the fault notification indicating the fault and the fault type to determine which LED to switch ON, and subsequently switching the corresponding LED ON at S198. For example, the LED panel may have four red LEDs, corresponding to each type of fault. Fault notification module will send the fault notification and the fault type to the LED panel, thereby causing the corresponding LED to switch ON.

Figure 10:
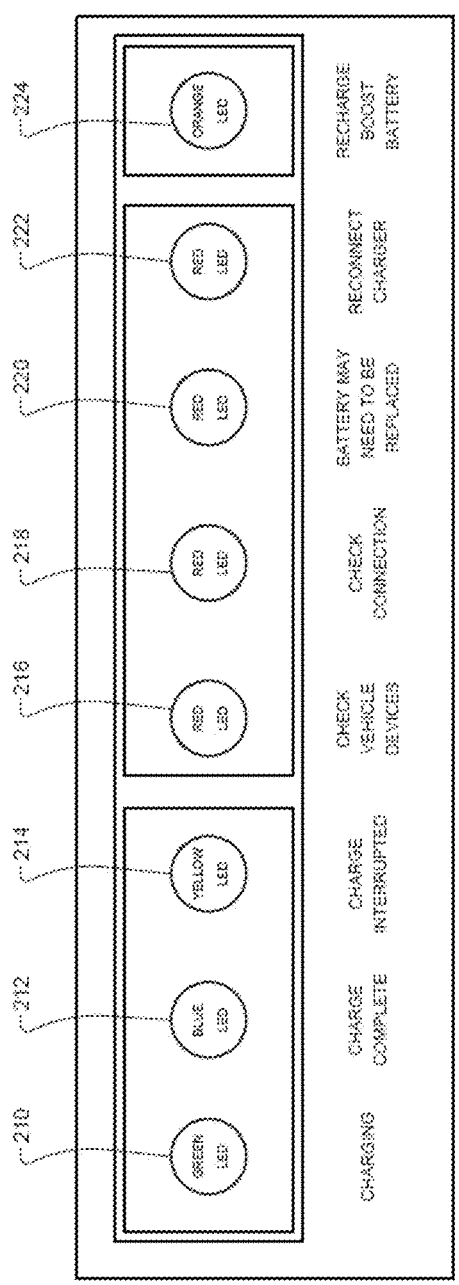
FIG. 10 illustrates an exemplary LED panel.

It should be appreciated that if no fault condition exists or is detected the battery boost device 10 will charge the vehicle battery for about 20 minutes. Once the charge is complete an LED indicating a completed charge, e.g. a green LED, may be switched on. While the battery boost is charging, a light indicating a charging state may be switched ON. An exemplary LED panel configuration is shown in FIG. 10. As can be seen, LEDs 210, 212 and 214 indicate the charging status, e.g. charging, charge complete or charge interrupted due to a fault condition. LEDs 216, 218, 220, and 222 indicate the type of fault conditions. It should be appreciated that the LED panel is optional and the configuration is exemplary. It is envisioned that other configurations may be used. Further, another means of alerting a user of the boost device 10 status may be implemented, such as an LCD screen displaying the status or audio alerts to the user.

The battery boost device 10 may also include a maintenance reminder circuit 36. An exemplary maintenance reminder circuit 36 is depicted in FIG. 12. The maintenance reminder circuit 36 may be powered by a secondary power source 32 such as a super capacitor, a rechargeable button cell battery or another low-cost means of independently powering the circuit. The maintenance reminder circuit 36 may also include a clock timer 70. It is appreciated that the clock timer 70 may be powered by the secondary power source 32 of the maintenance reminder circuit 36 or may draw power from the SLA battery directly. The clock timer is used to periodically activate an activation circuit 74 after the passing of predetermined time intervals, e.g. once a day. When activated, the activation circuit 74 may cause the secondary power source 36 to be recharged from the SLA battery 22. Further, the activation circuit 72 may activate the time monitoring circuit 72. Once activated, a time monitoring circuit 72 may compare the current timer value with a predetermined threshold, e.g. six months. If the current timer value read from the clock timer 70 is approaching six months since the previous charge, then the boost device 10 may alert the user of the required upcoming charge via fault notification module 60. If the amount of time since the previous charging exceeds the predetermined threshold or the boost device 10 is used to recharge a vehicle battery, the fault notification module may cause a maintenance notification LED 214 (FIG. 10) to indicate that the SLA battery needs to be recharged until the SLA battery is actually recharged. It is appreciated that the predetermined threshold for recharging the battery may be connected to the expected charge life of the battery, that is—the amount of time the SLA battery will hold a charge large enough to recharge a vehicle battery. While it is envisioned that six months is the time limit of current batteries, batteries capable of holding a charge for a longer time may be used. If so, the predetermined threshold for recharging the battery may be increased accordingly.

The time monitoring circuit 72 may be coupled to the charging circuit 20. Every time the SLA battery 22 of the battery boost device 10 is charged, the maintenance reminder circuit 36 resets the clock timer 70 by setting the timer 70 to zero. The clock timer 70 then begins to measure the amount of time since the previous recharging of the SLA battery again.

In some embodiments an audio or more complex visual indicator may be used to notify a user that the SLA battery needs to be recharged. For example, when the battery starts to near the six month period since the previous charge, the maintenance reminder module may generate a noise to the user every two or so hours. As the six month data approaches, the audio alerts may become louder and more frequent. Similarly, a cheap, small LCD screen may included on the battery boost device to indicate how much time remains until the next scheduled charging. The number that is displayed can correspond to the status of the clock timer. Namely, the LCD screen may display either the last charge date and the scheduled next date, or may include the amount of time remaining until the next charge, i.e. maximum time without charging—value of clock timer.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A portable battery boost apparatus for charging a vehicle battery comprising:
   a boost battery that couples to the vehicle battery;
   a voltage monitoring module that monitors an amount of voltage in the vehicle battery and outputs a voltage reading indicative of an amount of voltage in the vehicle battery;
   a fault monitoring module that determines an existence of a fault condition based on at least one of the voltage reading and a current reading indicating an amount of current flowing from the boost battery to the vehicle battery;
   a load determining module that determines an existence of a load in the vehicle drawing power from the vehicle battery based on the voltage reading, wherein a fault condition exists when the voltage reading does not increase by at least a predetermined amount over a predetermined time period; and
   a boost battery cutoff module that decouples the boost battery from the vehicle battery upon determining the existence of the fault condition.

2. The portable battery boost apparatus of claim 1 wherein the voltage monitoring module monitors the amount of current flowing from the boost battery to the vehicle battery.

3. The portable battery boost apparatus of claim 2 further comprising a connection monitoring module that determines an existence of a faulty connection between the boost battery and the vehicle battery based on the current reading, wherein the fault condition exists when the current reading is less than or equal to a predetermined lower threshold.

4. The portable battery boost apparatus of claim 1 further comprising a vehicle battery state monitoring module that determines an existence of a deep discharge condition in the vehicle battery based on the voltage reading, wherein the fault condition exists when an initial voltage reading is below a predetermined threshold.

5. The portable battery boost apparatus of claim 1 further comprising a charge cutoff detection module that determines an existence of charge being discontinued based on the current reading, wherein the fault condition exists when the current flowing from the boost battery to the vehicle battery is cutoff before the vehicle battery is charged.

6. The portable battery boost apparatus of claim 5 further comprising a timer monitoring an amount of time the current is cutoff, wherein the fault condition exists when the amount of time the current is cutoff exceeds a predetermined threshold.

7. The portable battery boost apparatus of claim 1 further comprising a charge timer that monitors an amount of time the boost battery is delivering a current to the vehicle battery, wherein the vehicle battery is charged when no fault condition exists and the amount of time exceeds a predetermined threshold.

8. The portable battery boost apparatus of claim 1 further comprising a maintenance module that determines a status of the boost battery based on an amount of time since the boost battery was previously charged, wherein a visual indicator indicates that the boost battery needs to be recharged when the amount of time since the boost battery was previously charged exceeds a predetermined threshold.

9. The portable battery boost apparatus of claim 1 further comprising an LED panel including a plurality of LEDs that indicate statuses of the apparatus, wherein the plurality of LEDs include:
   a first LED that indicates a load in the vehicle drawing power from the vehicle battery;
   a second LED that indicates a faulty connection between the boost battery and the vehicle battery;
   a third LED that indicates a deep discharge condition in the vehicle battery;
   a fourth LED that indicates a current to the vehicle battery has been cutoff; and
   wherein at least one of the plurality of LEDs is switched on based on a type of fault condition determined by the fault monitoring module.

10. A method for vehicle battery charging using a boost battery apparatus having a boost battery, the method comprising:
    coupling the boost battery to the vehicle battery;
    monitoring an amount of voltage in the vehicle battery and determining a voltage reading indicative of an amount of voltage in the vehicle battery;
    determining an existence of a fault condition based on at least one of the voltage reading and a current reading indicating an amount of current flowing from the boost battery to the vehicle battery;
    decoupling the boost battery from the vehicle battery upon determining the existence of the fault condition, and
    determining a status of the boost battery based on an amount of time since the boost battery was previously charged, wherein a visual indicator indicates that the boost battery needs to be recharged when the amount of time since the boost battery was previously charged exceeds a predetermined threshold.

11. The method of claim 10 further comprising determining an existence of a load in the vehicle drawing power from the vehicle battery based on the voltage reading, wherein a fault condition exists when the voltage reading does not increase by at least a predetermined amount over a predetermined time period.

12. The method of claim 10 further comprising monitoring the amount of current flowing from the boost battery to the vehicle battery.

13. The method of claim 12 further comprising determining an existence of a faulty connection between the boost battery and the vehicle battery based on the current reading, wherein the fault condition exists when the current reading is less than or equal to a predetermined lower threshold.

14. The method of claim 10 further comprising determining an existence of a deep discharge condition in the vehicle battery based on the voltage reading, wherein the fault condition exists when an initial voltage reading is below a predetermined threshold.

15. The method of claim 10 further comprising determining whether charge is discontinued based on the current reading, wherein the fault condition exists when the current flowing from the boost battery to the vehicle battery is cutoff before the vehicle battery is charged.

16. The method of claim 15 further comprising monitoring an amount of time the current is cutoff, wherein the fault condition exists when the amount of time the current is cutoff exceeds a predetermined threshold.

17. The method of claim 10 further comprising monitoring an amount of time the boost battery is delivering a current to the vehicle battery, wherein the vehicle battery is charged when no fault condition exists and the amount of time exceeds a predetermined threshold.

18. The method of claim 10 further comprising indicating statuses of the apparatus to a user via a plurality of LEDs, wherein the plurality of LEDs include:
 a first LED that indicates a load in the vehicle drawing power from the vehicle battery;
 a second LED that indicates a faulty connection between the boost battery and the vehicle battery;
 a third LED that indicates a deep discharge condition in the vehicle battery;
 a fourth LED that indicates a current to the vehicle battery has been cutoff; and
 wherein at least one of the plurality of LEDs is switched on based on a type of fault condition.

19. A portable battery boost apparatus for charging a vehicle battery comprising:
 a boost battery that couples to the vehicle battery;
 a voltage monitoring module that monitors an amount of voltage in the vehicle battery and outputs a voltage reading indicative of an amount of voltage in the vehicle battery;
 a fault monitoring module that determines an existence of a fault condition based on at least one of the voltage reading and a current reading indicating an amount of current flowing from the boost battery to the vehicle battery;
 a boost battery cutoff module that decouples the boost battery from the vehicle battery upon determining the existence of the fault condition; and
 a maintenance module that determines a status of the boost battery based on an amount of time since the boost battery was previously charged, wherein a visual indicator indicates that the boost battery needs to be recharged when the amount of time since the boost battery was previously charged exceeds a predetermined threshold.

20. The portable battery boost apparatus of claim 19 further comprising a vehicle battery state monitoring module that determines an existence of a deep discharge condition in the vehicle battery based on the voltage reading, wherein the fault condition exists when an initial voltage reading is below a predetermined threshold.

21. The portable battery boost apparatus of claim 19 further comprising a charge cutoff detection module that determines an existence of charge being discontinued based on the current reading, wherein the fault condition exists when the current flowing from the boost battery to the vehicle battery is cutoff before the vehicle battery is charged.

22. The portable battery boost apparatus of claim 19 further comprising a charge timer that monitors an amount of time the boost battery is delivering a current to the vehicle battery, wherein the vehicle battery is charged when no fault condition exists and the amount of time exceeds a predetermined threshold.

23. The portable battery boost apparatus of claim 19 further comprising an LED panel including a plurality of LEDs that indicate statuses of the apparatus, wherein the plurality of LEDs include:
 a first LED that indicates a load in the vehicle drawing power from the vehicle battery;
 a second LED that indicates a faulty connection between the boost battery and the vehicle battery;
 a third LED that indicates a deep discharge condition in the vehicle battery;
 a fourth LED that indicates a current to the vehicle battery has been cutoff; and
 wherein at least one of the plurality of LEDs is switched on based on a type of fault condition determined by the fault monitoring module.

* * * * *